(12) United States Patent
Dodge et al.

(10) Patent No.: US 9,189,435 B2
(45) Date of Patent: Nov. 17, 2015

(54) METHOD AND APPARATUS FOR ARBITRATION WITH MULTIPLE SOURCE PATHS

(71) Applicant: Apple Inc., Cupertino, CA (US)

(72) Inventors: Benjamin K. Dodge, San Jose, CA (US); Deniz Balkan, Santa Clara, CA (US); Gurjeet S. Saund, Saratoga, CA (US); Munetoshi Fukami, Newark, CA (US)

(73) Assignee: Apple Inc., Cupertino, CA (US)

( * ) Notice: Subject to any disclaimer, the term of this patent is extended or adjusted under 35 U.S.C. 154(b) by 353 days.

(21) Appl. No.: 13/868,313

(22) Filed: Apr. 23, 2013

(65) Prior Publication Data

US 2014/0317323 A1 Oct. 23, 2014

(51) Int. Cl.
*G06F 13/16* (2006.01)
*G06F 13/368* (2006.01)

(52) U.S. Cl.
CPC .............. *G06F 13/368* (2013.01); *G06F 13/16* (2013.01)

(58) Field of Classification Search
CPC .... G06F 13/16; G06F 13/1605; G06F 13/368
USPC ........... 710/119, 120, 123; 711/148, 151, 152
See application file for complete search history.

(56) References Cited

U.S. PATENT DOCUMENTS

| | | | |
|---|---|---|---|
| 6,732,209 B1* | 5/2004 | Cherukuri et al. | 710/240 |
| 7,275,126 B2 | 9/2007 | Purcell et al. | |
| 7,779,189 B2 | 8/2010 | Dunn et al. | |
| 8,285,892 B2 | 10/2012 | Arntzen et al. | |
| 2006/0155938 A1* | 7/2006 | Cummings et al. | 711/149 |
| 2007/0067531 A1 | 3/2007 | Kolinummi et al. | |
| 2010/0198936 A1* | 8/2010 | Burchard et al. | 709/212 |
| 2013/0019052 A1* | 1/2013 | Somanache et al. | 711/103 |
| 2014/0181419 A1* | 6/2014 | Saund et al. | 711/146 |

* cited by examiner

*Primary Examiner* — Glenn A Auve
(74) *Attorney, Agent, or Firm* — Meyertons, Hood, Kivlin, Kowert & Goetzel, P.C.; Erik A. Heter

(57) ABSTRACT

A method and apparatus for arbitration. In one embodiment, a point in a network includes first and second arbiters. Arbitration of transactions associated with an address within a first range are conducted in the first arbiter, while arbitration of transactions associated with an address within a second range are conducted in the second arbiter. Each transaction is one of a number of different transaction types having a respective priority level. A measurement circuit is coupled to receive information from the first and second arbiters each cycle indicating the type of transactions that won their respective arbitrations. The measurement circuit may update a number of credits associated with the types of winning transactions. The updated number of credits may be provided to both the first and second arbiters, and may be used as a basis for arbitration in the next cycle.

20 Claims, 4 Drawing Sheets

METHOD AND APPARATUS FOR ARBITRATION WITH MULTIPLE SOURCE PATHS

BACKGROUND

1. Technical Field

This disclosure is directed to integrated circuits, and more particularly, to controlling the flow of transactions having various priority levels in integrated circuits.

2. Description of the Related Art

Many modern integrated circuits (ICs) include on-chip communications networks of various types. Such on-chip networks may include buses and other types of links between various functional units of an IC. Networks may be implemented as crossbar networks, communications fabrics, or other type of network topology.

Since there are a number of different functional units that may compete for access to resources in an on-chip network, arbitration is often used to determine which functional unit obtains access to a given resource. Various types of arbitration schemes may be used. In some cases, transactions sent through the network may be designated as one of a number of different transaction types. Different transaction types may be associated with different priority levels. Priority levels of the arbitrated transactions may be used as a factor in determining which transaction eventually wins the arbitration. However, other factors may also be considered during arbitration so that traffic through the on-chip network may flow in a timely and orderly manner.

SUMMARY

A method and apparatus for arbitration in which there are multiple source paths and a single return path is disclosed. In one embodiment, a point in a network includes first and second arbiters. Arbitration of transactions associated with an address within a first range are conducted in the first arbiter, while arbitration of transactions associated with an address within a second range are conducted in the second arbiter. The return path for transactions output from the first and second arbiters is shared. Each transaction is one of a number of different transaction types having a respective priority level. A measurement circuit is coupled to receive information from the first and second arbiters each cycle indicating the type of transactions that won their respective arbitrations. The measurement circuit may update a number of credits associated with the types of winning transactions. The updated number of credits may be provided to both the first and second arbiters, and may be used as a basis for arbitration in the next cycle.

In one embodiment, the transactions may be memory read requests. The requests may be provided to an arbitration unit that includes the first and second arbiters, as well as the measurement circuit. Read requests associated with a memory address within a first range of memory addresses may be arbitrated by the first arbiter. Read requests associated with an address within a second range of memory address may be arbitrated by the second arbiter. The outputs of the first and second arbiters may be provided to a coherence unit, which provides further ordering of transactions in the respective input paths associated with the first and second arbiters. The coherence unit may output read requests to the memory controller, which may then respond to each memory requests by reading data from the memory. A single return path is provided to convey data from the memory. Each of the read requests may be associated with a particular type of request, the definition of which may include a priority level. For each read request, a variable number of credits, or weight, may be associated therewith. Arbitration in the first and second arbiters may be based at least in part on the number of credits for each type of request that is being arbitrated. Each time a request wins in an arbitration cycle, the measurement circuit may reduce the number of credits associated with its respective request type. An updated number of credits for the various request types may then be provided to both of the first and second arbiters. Request of a given type having a number of credits reduced to zero may be inhibited from forward progress in the first and second arbiters if requests are pending of another type in which credits are available (i.e. non-zero). Requests of a given type having a number of credits reduced to zero may be allowed to advance when no other types of requests are pending. The measurement circuit may perform a reset of the number of credits available to each request type responsive to the number of credits of each request type having been reduced to zero.

In general, a method and apparatus is described herein where two physically separate arbitration paths share information regarding the respective weights of each transaction type. Since the two physically separate arbitration paths share a physically common return path, sharing the same information regarding the respective weights/number of credits available to each transaction may prevent certain types of transactions consuming the bandwidth of the return path. Moreover, this may allow higher priority transactions to be serviced to more effectively utilize the bandwidth of the return path in the presence of a large number of lower priority transactions that might otherwise be serviced at the expense of the high priority transactions. It is noted that in fabric-based embodiments, the bandwidth requirements may be determined per source, priority levels, and virtual channels, and not the directionality (first arbiter or second arbiter) of the transactions. Accordingly, transactions arriving from the same source (e.g., priority, virtual channel, etc.), are not treated as separate streams based on their respective address associations that would route them either to one arbiter or the other. Thus, if a transaction from a particular source is to be blocked on one of the arbiters, e.g., based on weights, transactions from that particular source may also be blocked in the other arbiter on the same basis.

BRIEF DESCRIPTION OF THE DRAWINGS

The following detailed description makes reference to the accompanying drawings, which are now briefly described.

Figure 1:
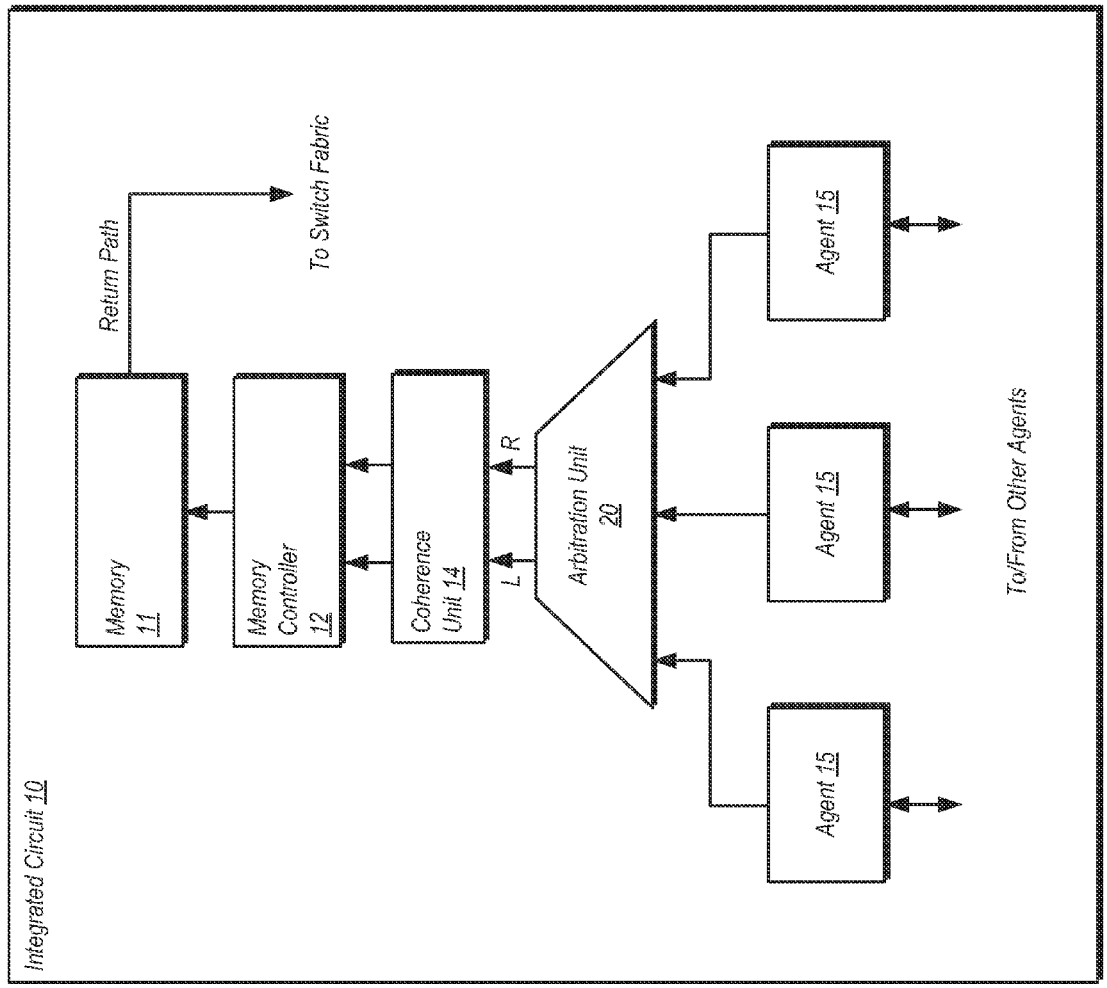
FIG. 1 is a block diagram of one embodiment of an integrated circuit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description.

As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of an integrated circuit (IC) is shown. In the embodiment shown, IC 10 includes a memory 11, a memory controller 12, a coherence unit 14, an arbitration unit 20, and a number of agents (i.e. functional units) 15. IC 10 may include additional functional units not shown here for the sake of simplicity. For example, IC 10 may include one or more processor cores, a graphics processing unit, an input/output (I/O) unit, and so on. It is further noted that agents 15 may be any type of functional unit implemented on IC through which the operation discussed below may be implemented.

In one embodiment, IC 10 may implement a switch fabric for on-chip communications. In general, IC 10 may implement an on-chip network. The on-chip network may be one of a number of different possible on-chip network topologies, such as the switch fabric discussed above, a crossbar network, or other type. Thus, while the remainder of the discussion will focus on the switch fabric, the disclosure is not intended to be limited to this particular on-chip network topology.

Each of agents 15 may be coupled to, or part of, the switch fabric, and may thus exchange data with other agents to which they are coupled. Moreover, each of the agents 15 may provide a portion of a communications path to convey transactions to other agents. In this particular example, each of agents 15 may also be used to convey transactions (e.g., memory read requests) to arbitration unit 20. The requests may be initiated by the agents 15 that are explicitly shown in the drawing, or by other agents in the switch fabric whose communications may be funneled through those shown here.

Arbitration unit 20 in the embodiment shown is coupled to receive memory read requests that are conveyed from/through the agents 15 shown in FIG. 1. As is further discussed below, arbitration unit 20 includes two arbiters (or arbitration circuits), one designated 'L' here, for left, and one designated 'R', for right. Read requests may be routed to either the left arbiter or right arbiter depending on their address. More particularly, if an address associated with a given read request falls within a first range of addresses, then the read request may be routed to the left arbiter. If an address associated with a read request falls within a second range of addresses (that is non-overlapping with the first), then the read request may be routed to the right arbiter. The left and right arbiters may arbitrate read requests largely independent of one another. That is, the winner of an arbitration cycle in the left arbiter is not dependent upon or otherwise affected by a winner of an arbitration in the right arbiter, and vice versa.

Memory read requests that win their respective arbitrations are forwarded to coherence unit 14. Coherence unit 14 may perform re-ordering of read requests in some cases. In particular, since the switch fabric implemented in IC 10 includes multiple, independent paths to convey memory read requests, coherence unit 14 may re-order memory read requests so that they are satisfied in a correct order, particularly if memory write requests are also pending.

The read requests are then forwarded from coherence unit 14 to memory controller 12. The requests may be forwarded separately as received via left and right channels. Memory controller 12 may respond to the received memory read requests by reading data from memory 11 at the designated addresses. The data may be returned to the switch fabric via a single return path as shown. Thus, while memory requests may be arbitrated and subsequently provided to coherence unit 14 and memory controller 12 via two separate paths (i.e. the left and right channels), the return path (and thus the bandwidth thereof) for data read responsive to the memory read requests is shared. Since this return path is shared, arbitration unit 20 may implement additional functionality to ensure the bandwidth of the return path is not consumed by lower priority read requests at the expense of higher priority read requests.

Figure 2:
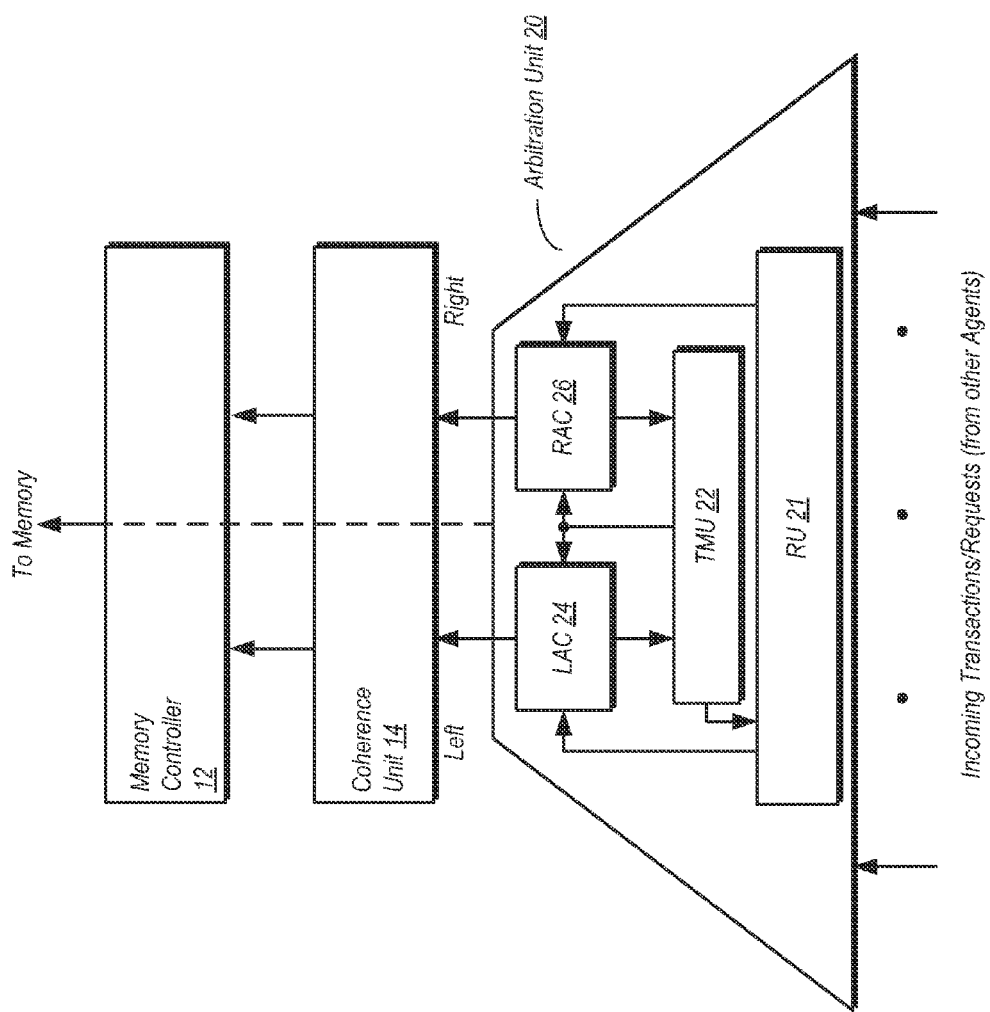
FIG. 2 is a block diagram illustrating one embodiment of an arbitration unit having multiple arbitration circuits.

FIG. 2 illustrates one embodiment of arbitration unit 20 and the input paths to memory controller 12. In the embodiment shown, arbitration unit 20 includes a routing unit 21, which is coupled to receive each of the incoming memory read requests. Routing unit 21 may read the address associated with each incoming read request and route that request to the appropriate arbitration circuit. As noted above, memory read requests having an address within a first range of addresses may be routed to left arbitration circuit (or arbiter) 24, while read requests having an address within a second range of addresses may be routed to right arbitration circuit (or arbiter) 26. Left arbiter 24 and right arbiter 26 may arbitrate transactions independently of one another. In the embodiment shown, both left arbiter 24 and right arbiter 26 may arbitrate using an implementation of a deficit weighted round robin arbitration scheme. Thus, while left arbiter 24 and right arbiter 26 may arbitrate independently of one another, they may nevertheless share information regarding the weighting of memory read requests.

In the embodiment shown, each memory read request may be one of a number of different types. For example, a first type of memory read request may be designated as a high priority request, while a second type may be designated as a low priority request. In some embodiments, the request types may be further divided. For example, in one embodiment, requests may be categorized as real time requests, low latency requests, or bulk requests, each having various priority levels. Furthermore, some request types, such as the real time requests, may be further subdivided into, e.g., real time red, real time yellow, and real time green requests, each having its own individual priority level. Irrespective of how the requests are subdivided by type, each request type may be associated with a weight that may be varied during operation.

In one embodiment, the weight for each request type may be expressed as a number of credits. As requests of a particular type are granted (i.e., win their respective arbitrations), the number of credits for that type may be reduced/decremented. When a particular request type has had its number of credits reduced to zero, subsequent requests of that type may be inhibited from forward progress if there are other pending requests of a type that has remaining credits. If requests are pending of a particular type that has zero credits, but no other types of requests are pending, then the remaining requests may be allowed to progress. If all types of requests have had their respective number of credits reduced to zero, the number of credits for each type of transaction may be reset to a predefined number. Subsequently, requests of any type may be allowed to advance providing they win their respective arbitrations. Managing requests in this manner may prevent one type of request from consuming the bandwidth of the single return path at the expense of other types of requests.

Information regarding the weighting of requests may be provided to and updated by transaction measurement unit 22. After each arbitration cycle, left arbiter 24 and right arbiter 26 may provide information to transaction measurement unit 22 indicating the type of memory request that won their respective arbitrations. Responsive thereto, transaction measurement unit 22 may update the number of credits available to each of the winning request types. In the embodiment shown, the updating may be accomplished by subtracting credits from the winning request types. Transaction measurement unit 22 may then provide updated credit information to both left arbiter 24 and right arbiter 26. Thus, while left arbiter 24 and right arbiter 26 may operate independently of one another, they may nevertheless utilize a common pool of information regarding the number of credits available to each transaction type. This information may then be used in each arbiter during the next arbitration cycle, as a basis for determining which of the currently arbitrated requests is to win their respective arbitrations. In one embodiment, more arbitration weight is afforded to those requests associated with a type having a higher number of credits, and thus such requests are more likely to win their respective arbitrations. This cycle may be repeated for each arbitration cycle.

As noted above, if a given request type has zero credits while requests are pending for another type in which credits are available, requests of the type having zero credits may be inhibited from making forward progress. In one embodiment, transaction measurement unit 22 may report such request types to routing unit 21, which may in turn inhibit requests of that type from being presented to the arbiters. In another embodiment, such requests may be presented to the arbiters, but will nevertheless lose arbitration to other requests of types in which credits are available. Requests of the type having zero credits may be allowed to resume forward progress under certain conditions. If no other requests are pending, requests of a type having zero credits may be allowed to make forward progress, being presented to the arbiters and being allowed to win their respective arbitrations. If all of the request types have had their respective number of credits reduced to zero, transaction measurement unit 22 may then reset the number of credits for each type of request to a predetermined value. Thereafter, requests of any type may be allowed to resume forward progress.

Figure 3:
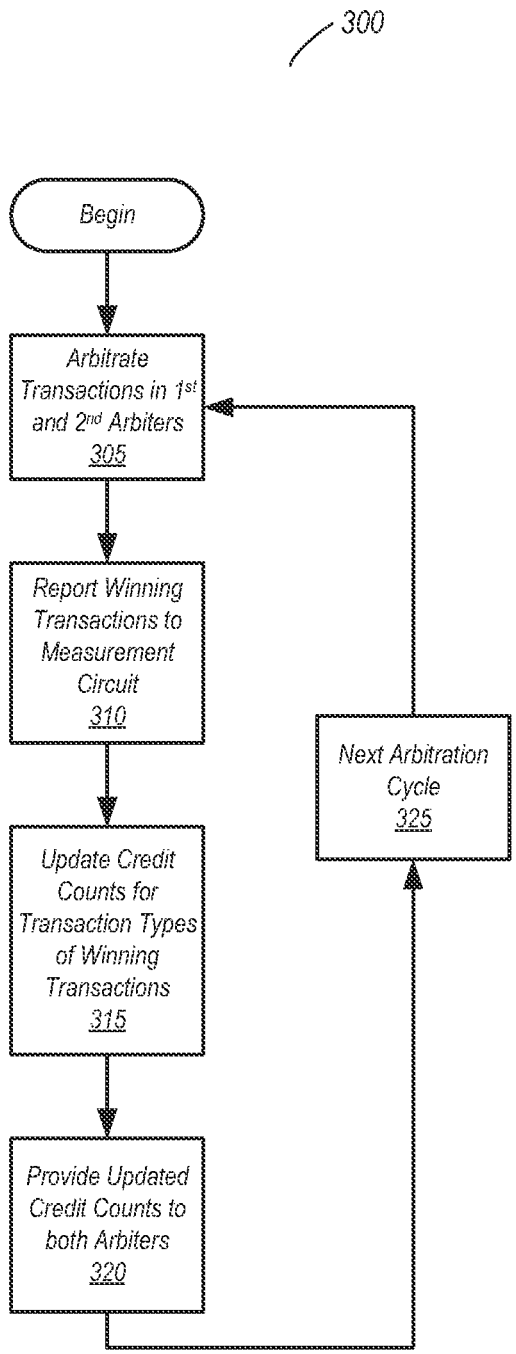
FIG. 3 is a flow diagram illustrating one embodiment of a method for performing arbitration.

FIG. 3 is a flow diagram illustrating one embodiment of a method for arbitrating transactions (e.g., memory read requests). Method 300 may be performed by the various hardware embodiments discussed above. However, it is further contemplated that method 300 may be performed by hardware embodiments that are not discussed herein.

Method 300 begins with the arbitration of transactions in first and second arbiters (block 305). The first and second arbiters may arbitrate transactions independently of one another. The transactions arbitrated by the first and second arbitration units may depend on various information associated with those transactions, such as respective memory addresses as discussed above.

Upon completing their respective arbitrations, the winning transactions (or type thereof) may be reported to a measurement circuit (block 310). The measurement circuit may update credit counts for transaction types corresponding to the winning transactions (block 315). In one embodiment, the number of credits for each winning transaction type may be decremented. As the number of credits for a given transaction type is decremented, subsequent transactions of that type have less weight in future arbitrations, and are thus less likely to win. The updated credit counts may then be provided to both arbiters (block 320). Thus, while the arbiters operate independently of one another, they nevertheless share common information regarding the weighting of different transaction types. Method 300 then progresses to the next arbitration cycle (block 325), with the arbiters using the updated credit count information.

It is noted that while specific embodiments have been discussed above, the disclosure is not intended to be limiting to those embodiments. For example, while the embodiments of FIGS. 1 and 2 have been directed to arbitration of memory read requests, the disclosure may be applied to other types of transactions. Furthermore, the number of arbiters and types of on-chip networks through which transactions may be conveyed is not limited to the switch fabric embodiments discussed above. In general, various embodiments of the method and apparatus discussed herein may be applied to any embodiment in which transactions of various priorities are arbitrated and in which some portion of a communications path is shared while other portions thereof are not shared.

Figure 4:
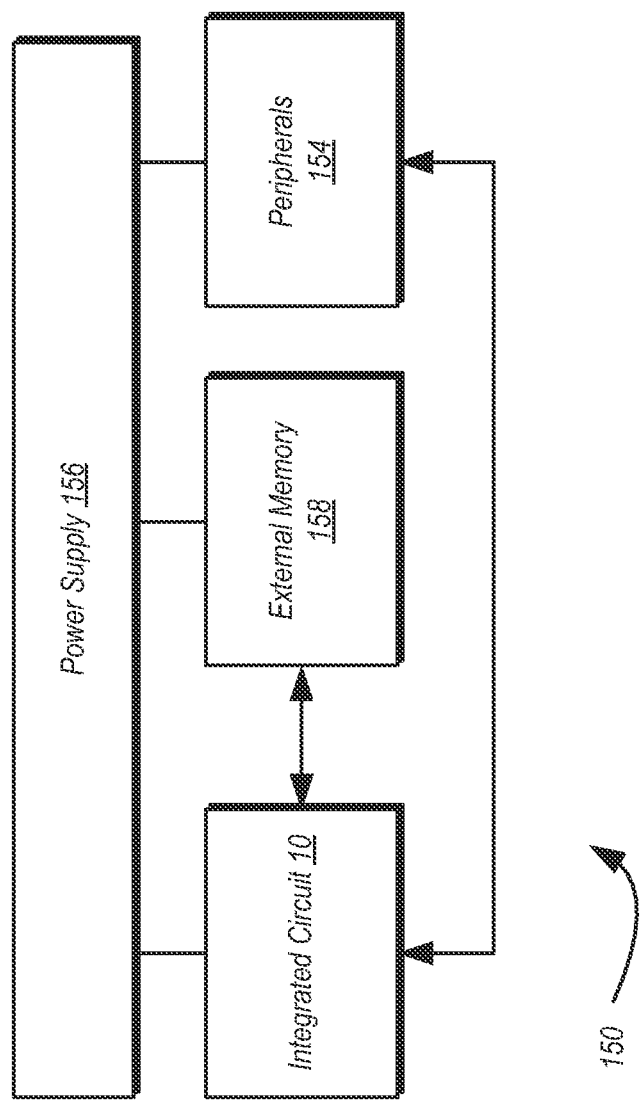
FIG. 4 is a block diagram of one embodiment of an exemplary system.

Turning next to FIG. 4, a block diagram of one embodiment of a system 150 is shown. In the illustrated embodiment, the system 150 includes at least one instance of the integrated circuit 10 coupled to external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. An apparatus comprising:
a first arbitration circuit coupled to receive transactions from a plurality of agents, wherein the first arbitration circuit is configured to perform arbitration on transactions associated with a first range of memory addresses;
a second arbitration circuit coupled to receive transactions from the plurality of agents, wherein the second arbitration circuit is configured to perform arbitration on transactions associated with a second range of memory addresses; and
a measurement circuit coupled to each of the first and second arbitration circuits, wherein the measurement circuit is configured to determine priority information indicative of respective priority levels for each transaction granted by each of the first and second arbitration circuits, and wherein the first and second arbitration circuits are configured to perform arbitration between respectively received transactions based on the priority information.

2. The apparatus as recited in claim 1, wherein the priority information comprises a number of credits for each of a plurality of transaction types, wherein each of the plurality of transaction types are defined by a priority level.

3. The apparatus as recited in claim 2, wherein for a most recent arbitration cycle, the first and second arbitration circuits are configured to indicate to the measurement circuit respective priority levels of transactions that won arbitration in the most recent arbitration cycle.

4. The apparatus as recited in claim 3, wherein the measurement circuit is configured generate an updated number of credits available to each transaction type corresponding to those transactions that won arbitration in the most recent arbitration cycle, wherein generating the updated number of credits available to a given transaction type comprises reducing a number of credits available to the given transaction type responsive to a transaction of the given transaction type winning an arbitration.

5. The apparatus as recited in claim 4, wherein the measurement circuit is configured to provide the updated number of credits to each of the first and second arbitration circuits, wherein each of the first and second arbitration circuits are configured to perform arbitration based at least in part on the updated number of credits available to each transaction type.

6. The apparatus as recited in claim 5, wherein the first and second arbitration circuits are configured to inhibit forward progress for transactions of a particular one of the plurality of transaction types when a number of credits for that transaction type is zero and when transactions are pending for another one of the plurality of transaction types having a non-zero number of credits.

7. The apparatus as recited in claim 6, wherein the measurement circuit is configured to reset a number of credits for each of the plurality of transaction types when each of the plurality of transaction types has zero credits.

8. A method comprising:
arbitrating a plurality of transactions, wherein each of the plurality of transactions is associated with one of a plurality of transaction types, wherein transactions associated with a first range of memory addresses are arbitrated in a first arbitration circuit, and wherein transactions associated with a second range of memory addresses are arbitrated in a second arbitration circuit, and wherein said arbitrating is performed based at least in part on respective numbers of credits associated with each of the plurality of transaction types;
updating a respective number of credits for each one of the plurality of transaction types that correspond to transactions that won their respective arbitrations; and
providing, to each of the first and second arbitration circuits, updated information indicating the respective number of credits available to each of the plurality of transaction types.

9. The method as recited in claim 8, wherein each of the plurality of transaction types is defined by a respective a priority level.

10. The method as recited in claim 8, further comprising each of the first and second arbitration circuits indicating, to a measurement circuit, which ones of the plurality of transaction types are associated with winning transactions for each cycle of arbitration.

11. The method as recited in claim 10, further comprising the measurement circuit decrementing a number of credits for each of the plurality of transactions types associated with the transactions that won in each cycle of arbitration.

12. The method as recited in claim 11, further comprising the measurement circuit providing the number of credits for each of the plurality of transaction types to each of the first and second arbitration circuits subsequent to said decrementing.

13. The method as recited in claim 12, further comprising inhibiting forward progress of transactions corresponding to one of the plurality of transaction types in which a corresponding number of credits is zero when transactions are pending for another one of the plurality of transaction types having a non-zero number of credits.

14. The method as recited in claim 13, further comprising resetting a number of credits for each of the plurality of transaction types when each of the plurality of transaction types has zero credits.

15. The method as recited in claim 8, further comprising the first and second arbitration circuits performing respective arbitrations independently from one another.

16. An integrated circuit comprising:
a plurality of requestors configured to generate memory read requests, each of the memory read requests having one of a plurality of request types, and wherein each of the memory requests is associated with a particular memory address;
a first arbitration circuit configured to perform arbitration on memory read requests associated with an address within a first range of the memory addresses;
a second arbitration circuit configured to perform arbitration on memory requests associated with an address within a second range of the memory addresses; and
a transaction circuit configured to update respective weights for each of the plurality of request types based on which memory read requests win given cycles of arbitration in the first and second arbitration circuits, and wherein the first and second arbitration circuits are configured to arbitrate memory read requests based on respective weights for each of the plurality of request types.

17. The integrated circuit as recited in claim 16 wherein, for each arbitration cycle, the first and second arbitration circuits are configured to provide to the transaction circuit indications of which of the plurality of request types correspond to the memory read requests that won in that arbitration cycle, and wherein the transaction circuit is configured to provide information indicative of respective weights for each of the plurality of request types to each of the first and second arbitration circuits prior to each arbitration cycle.

18. The integrated circuit as recited in claim 16, wherein each of the first and second arbitration circuits are configured to inhibit forward progress of memory read requests associated with a particular one of the request types having a weight of zero when one or more other ones of the plurality of request types have a weight that is non-zero.

19. The integrated circuit as recited in claim 16, wherein the transaction circuit is configured to reset weights to a predetermined value for each of the plurality of request types responsive to each of the plurality of request types having a weight of zero.

20. The integrated circuit as recited in claim 16, wherein the integrated circuit further comprises:
- a coherence unit configured to re-order memory read requests received from the first and second arbitration circuits; and
- a memory controller configured to read data from a memory based on memory read requests received from the coherence unit.

* * * * *